(12) United States Patent
Bruder

(10) Patent No.: US 7,223,042 B1
(45) Date of Patent: May 29, 2007

(54) SUPPORTING PROFILE

(75) Inventor: Hans Bruder, Aichtal/Aich (DE)

(73) Assignee: Octanorm-Vertriebs-GmbH fuer Bauelemente, Filderstadt (DE)

( * ) Notice: Subject to any disclaimer, the term of this patent is extended or adjusted under 35 U.S.C. 154(b) by 805 days.

(21) Appl. No.: 10/030,818

(22) PCT Filed: Jul. 6, 2000

(86) PCT No.: PCT/EP00/06400

§ 371 (c)(1),
(2), (4) Date: Jun. 7, 2002

(87) PCT Pub. No.: WO01/04438

PCT Pub. Date: Jan. 18, 2001

(30) Foreign Application Priority Data

Jul. 13, 1999 (DE) .......................... 299 12 201 U

(51) Int. Cl.
*F16C 11/06* (2006.01)

(52) U.S. Cl. ...................... 403/161; 403/162; 403/252; 403/255; 403/359.1; 403/43

(58) Field of Classification Search ............. 403/3, 403/4, 65, 73, 76, 231, 217, 169, 161–163, 403/252, 255, 359.1, 263, 264, 43–48, 10, 403/49, 68; 256/70

See application file for complete search history.

(56) References Cited

U.S. PATENT DOCUMENTS

| 2,538,483 A | * | 1/1951 | Summers |
| 3,945,742 A | | 3/1976 | Condevaux |
| 4,410,157 A | * | 10/1983 | Monti et al. .................... 403/3 |

FOREIGN PATENT DOCUMENTS

DE          38 18 483 A1    12/1989

(Continued)

OTHER PUBLICATIONS

Merriam-Webster's Collegiate Dictionary 1998, Tenth Edition, p. 540.*

(Continued)

*Primary Examiner*—Daniel P. Stodola
*Assistant Examiner*—Victor MacArthur
(74) *Attorney, Agent, or Firm*—Crowell & Moring LLP

(57) ABSTRACT

The invention relates to a supporting profile for structures used at fairs and exhibitions which is provided, on the exterior thereof, with longitudinally extending grooves for connecting additional supporting profiles, and which, in a core area, comprises a receiving compartment for a turnbuckle. This receiving compartment is part of an adapter piece which is inserted into guides of the supporting profile and which is axially retained by securing means that are inserted into bore holes of the profile. In addition, an end plate is provided which is adapted to the cross-section of the supporting profile, which is placed at least on an open face of the supporting profile, and which is connected to the adapter piece. This end plate can be configured as a shaped body in order to be adapted to the outer curvature of a round profile. In addition, the end plate can also comprise a joint part so that additional supporting profiles can be connected in an articulated manner.

9 Claims, 2 Drawing Sheets

| | FOREIGN PATENT DOCUMENTS | | FR | 2653836 | 5/1991 |
|----|----|----|----|----|----|
| DE | 44 06 208 A1 | 9/1994 | | | |
| DE | 29508686 | 9/1996 | | | |
| DE | 29821204 | 2/1999 | | | |
| DE | 298 21 204 U1 | 4/1999 | | | |
| DE | 198 03 774 A1 | 8/1999 | | | |

OTHER PUBLICATIONS

International Search Report, PCT/EP 00/06400, Oct. 24, 2000.
German Search Report.

* cited by examiner

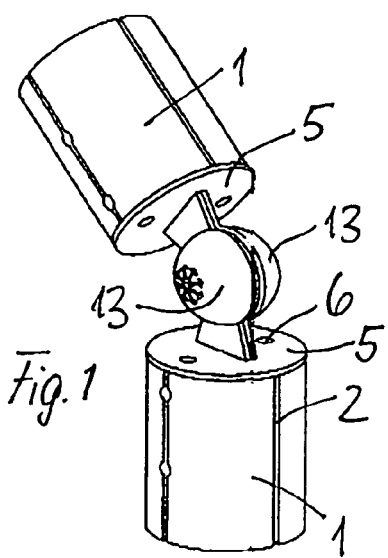
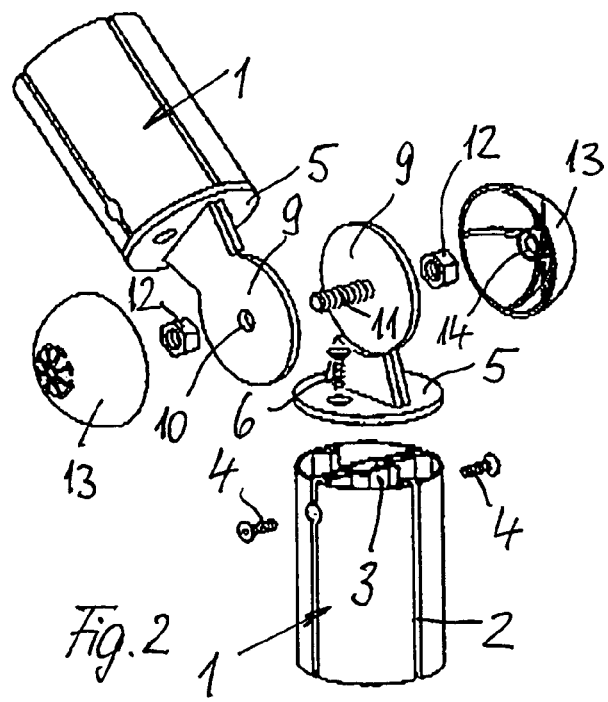
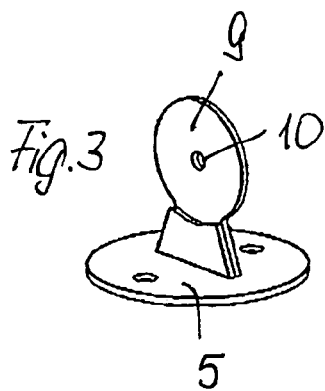
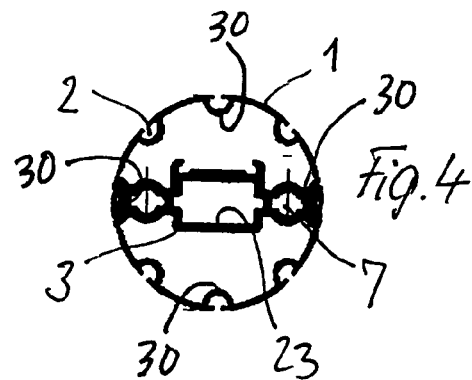
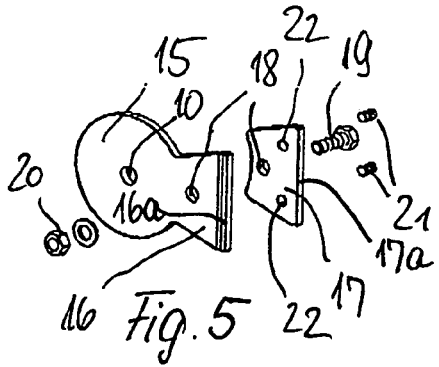
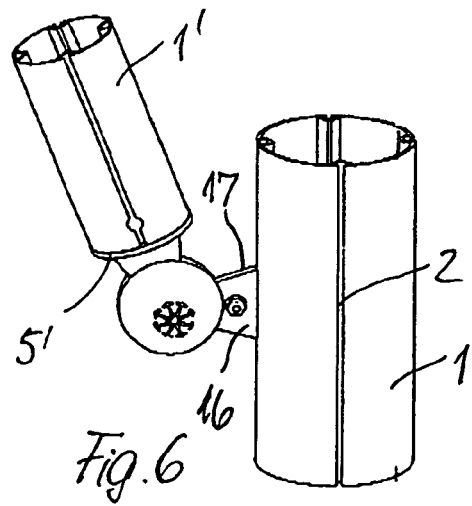

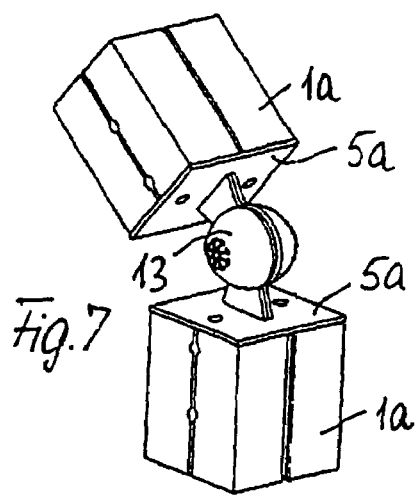
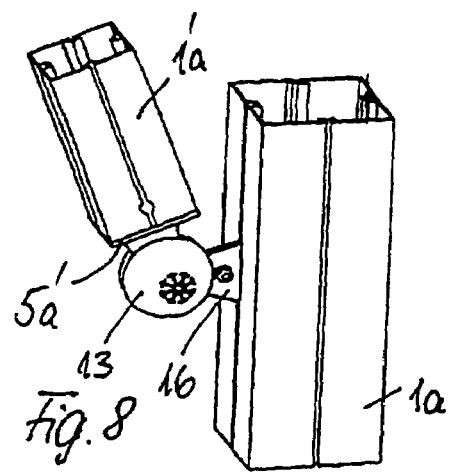
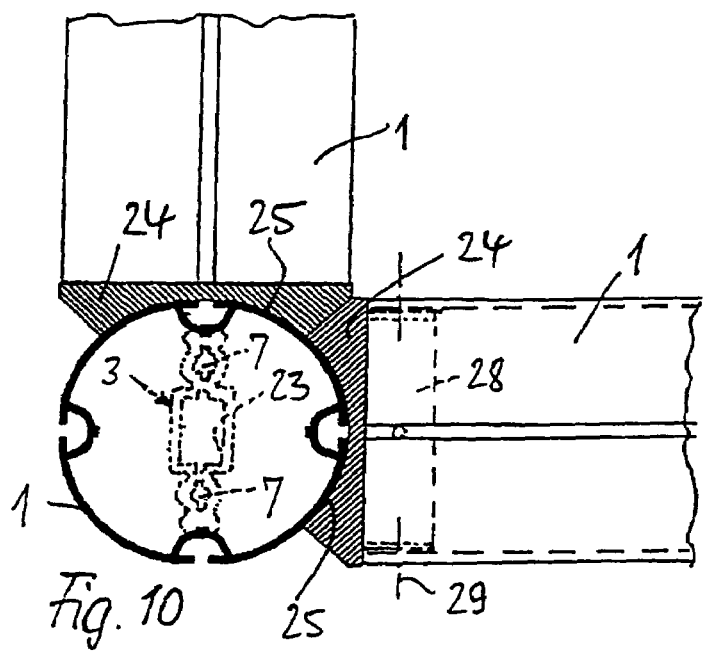
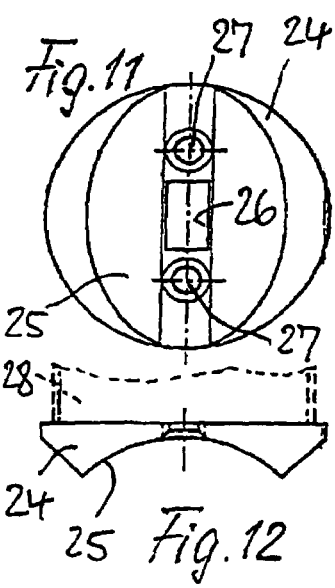
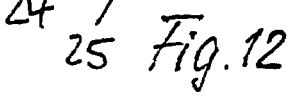
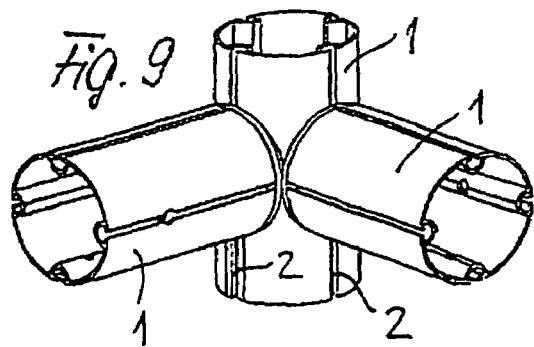

SUPPORTING PROFILE

BACKGROUND AND SUMMARY OF THE INVENTION

The invention relates to a supporting profile for a system for erecting structures such as for fairs, exhibits or stores a generic system of this type is conventionally provided with longitudinally extending exterior grooves for connecting additional supporting profiles or structural parts of the construction system. In a core area, a receiving chamber for a turnbuckle is provided, being integrated into a first adapter piece which is inserted in guides pointing toward the interior of the supporting profile, and held axially by means of securing devices which are inserted in bores penetrating the guides.

A supporting profile of this type disclosed in German Patent Document DE-U 298 21 204 has a hollow profile, into which an adapter piece is in each case inserted and axially fastened on the faces. The adapter piece has axially extending chambers for receiving at least one turnbuckle which, in turn, can be utilized for fastening such supporting profiles on externally extending grooves of additional supporting profiles of the same or a similar type on the face side.

Supporting profiles of this type have a relatively low weight because they are provided with the adapter pieces only on their faces and otherwise remain hollow.

For fair and exhibition constructions, as well as for store constructions, it is often desirable to have structures are often desirable which require an angular arrangement of supporting profiles with respect to one another. This is not possible in the case of the supporting profile of the above-mentioned type. Other known supporting profiles also can not easily be used for the desired constructions.

It is therefore an object of the present invention to further develop supporting profiles of the initially mentioned type such that additional uses are possible or that well-designed further developments can be achieved.

To achieve this object, in the case of a supporting profile of the initially mentioned type, an end disk, which is adapted to the cross-section of the supporting profile, is provided on at least one open face of the supporting profile and is connected with the adapter piece. This results in a simple embodiment.

In a further development of the invention, the end disk may be constructed as a formed body with a concave recess which is adapted to the external curvature of a round profile. The face-side mutual connection of round profiles can take place in this manner without unattractive gaps and without the requirement of cumbersome work of inserting adapting pieces during the assembly. The end disks are fixedly disposed on the face of the assigned supporting profile. As a further development of this embodiment, the formed body may also be provided with a passage opening for guiding through a turnbuckle which will then permit the fastening of the supporting profile on the external grooves of another profile. The turnbuckle is axially held in the interior of the supporting profile by the initially mentioned adapter piece. It was found in this case that the turnbuckle can also be utilized for holding the end disk on the face of the supporting profile. When the turnbuckle is placed in an external groove of another profile, by means of this tensioning operation, the end disk is simultaneously also fixedly clamped in. Therefore, a separate fastening of the end disk on the face will only become necessary when the assigned supporting profile accommodates no turnbuckle.

As a further development of the invention, the end disk may also be provided with a joint part for connection with additional profiles. The joint part may include a disk which extends perpendicular to the end disk and has a center bore. The joint part may include a second disk which is connected with the first disk by means of a bolt acting as an axis of rotation and which is equipped with fastening devices for another profile. When the second disk is connected with another end disk, this embodiment will permit the joint-type joining of the faces of two supporting profiles.

As a further development of the invention, the second disk is provided with a clamping part for the insertion into one of the longitudinally extending grooves of another supporting profile allowing the articulated connection of a supporting profile to the longitudinal side of a first profile.

As a further development of the invention, in order to attractively cover the outside of the disks serving as a joint, hemispheres can be provided for the lateral covering of the disks. These hemispheres, as a further development of the invention, have a center bore with a thread and by means of this thread are screwable upon a thread at the ends of the bolt penetrating the disks.

The invention is illustrated in the drawing by means of embodiments and will be explained in the following.

BRIEF DESCRIPTION OF THE DRAWINGS

FIG. 1 is a perspective partial view of further developed supporting profiles according to the invention which are mutually connected by way of a joint;

FIG. 2 is an exploded view of the arrangement according to FIG. 1;

FIG. 3 is a view of one of the end disks used in the embodiment according to FIG. 1;

FIG. 4 is a face-side view of one of the supporting profiles according to FIGS. 1 and 2;

FIG. 5 is a view of a clamping piece for the connection with an end disk according to FIG. 3 for a fastening to an external groove of a supporting profile;

FIG. 6 is a view of the insert of the clamping piece of FIG. 5 for the articulated arrangement of two profiles;

FIG. 7 is a view of the supporting profiles according to the invention similar to FIG. 1 but with a square cross-section;

FIG. 8 is a representation similar to FIG. 6 but with supporting profiles with a square cross-section;

FIG. 9 is a perspective partial view of three supporting profiles with a round cross-section which are assembled to form a junction point;

FIG. 10 is a schematic sectional view of the junction point according to FIG. 9;

FIG. 11 is a view of one of the end disks used for assembling the profiles according to FIGS. 9 and 10; and FIG. 12 is a lateral view of the end disk according to FIG. 11.

DETAILED DESCRIPTION OF THE DRAWINGS

FIGS. 1 to 4 show a first embodiment of the invention. Here, two supporting profiles 1 each have a round cross-section and, on their outer circumference, longitudinally extending grooves 2. At their open front ends, the supporting profiles each have a slid-in adapter piece 3. This adapter piece 3 is utilized for fastening an end disk 5 on the face side of the supporting profile 1 by means of screws 6 which are threaded in the threaded openings 7 of the adapter piece 3. The adapter piece 3 is inserted in guides 30 pointing toward the interior of the supporting profile 1 and is axially held by means of securing devices which are inserted in bores penetrating the guides 30. In the illustrated embodiment, for example, the adapter piece 3 is held in the axial position by screws 4 laterally inserted into the corresponding openings. A lug having an end in the shape of a disk 9 is fastened on the end disk 5 and extends perpendicularly from the disk surface. The disk 9, as illustrated particularly in FIG. 3, is provided with a center bore 10. A bolt 11, threaded at least at one of its two ends, is guided through the center bores 10 of the disk-type ends 9 of both end disks 5, connecting the end disks 5 in a mutually rotatable manner. The end disks 5 are each mounted in the above-described manner on the face side on the supporting profiles 1. Nuts 12 hold the two disks 9 against one another. In order to permit a tool-less assembly, butterfly nuts instead of the nuts 12 may be used in this case. The disks are then, for aesthetic reasons, covered on the outside by hemispheres 13 respectively. Each hemisphere is screwed onto the thread of the respective bolt 11 by means of a threaded part 14 provided in the hemisphere 13. The arrangement according to FIG. 1 therefore permits the articulated joining of two supporting profiles in each case by the arrangement of end disks.

FIGS. 5 and 6 show a variant of the embodiment shown in FIG. 1. In FIGS. 5 and 6, the disk 9 of an end disk 5', which has a smaller diameter than the end disks 5 of FIGS. 1 to 4, is connected with a disk body 15 (FIG. 5) whose attachment 16 is not fastened to an end disk. The attachment 16 interacts with a clamping piece 17 which, by way of a screw guided through the bores 18 and a pertaining nut 20, is held on the lug 16 so that it can be swivelled from side to side. Two clamping screws 21 are inserted into threaded bores 22 of the clamping piece 17 and can, in each case, press the free edge 17a of the clamping piece away from the free edge 16a. The free edge 16a has an elevation projecting toward the outside, so that, as illustrated by FIG. 6, the clamping piece is first slid into the open side of the groove 2 and is then laterally spread open, so that the parts 17 and 16 are jammed inside the groove. In the embodiment of FIG. 6, the supporting profiles 1 and 1', which have different diameters, can thereby be connected in an articulated manner.

FIGS. 7 and 8 show embodiments similar to those of FIGS. 1 and 6, but the supporting profiles 1a and 1a' each have a square cross-section and, for this reason, the end disks 5a each also have a square construction. In this case, the supporting profile 1a' has smaller dimensions. Otherwise, the construction of the joint itself corresponds to that of FIGS. 1 and 2 or to the further development according to FIGS. 5 and 6. It is also possible to combine the end disks 5a or 5a' having the square cross-section with end disks 5 or 5' by way of a joint (disks 9), so that supporting profiles 1 or 1' can be mounted in an articulated manner on supporting profiles 1a, 1a'.

FIG. 9 shows an arrangement in which two supporting profiles 1 with a round cross-section are fastened in a horizontally aligned manner on a vertically aligned supporting profile 1 in known fashion. A turnbuckle is inserted into the rectangular center chamber 23 of the adapter piece 3 (FIG. 4). The turnbuckle, as described, for example, in German Patent Document DE-U 298 21 204, is used for fastening the horizontal supporting profiles 1 to the grooves 2 of the vertical supporting profile 1. In order to avoid an unattractive wedge-shaped space between the plane faces of the horizontal supporting profile 1 and the curvature of the vertical supporting profile 1, an end disk 24, as shown in FIGS. 10 to 12, is provided which is constructed as a formed body with a concave curvature 25. The end disk 24 also provides a more stable joint. As illustrated in FIGS. 11 and 12, this end disk 24 has a central opening 26 for the turnbuckle to pass through. On both sides of this opening 26, the end disk 24 has two openings 27 through which the screws can pass through and can be screwed into the openings 7 of the adapter piece 3. In this manner, the end disk 24 can be fixedly connected with the corresponding supporting profile 1. However, it was found that such a fastening by means of screws is not absolutely necessary if the turnbuckle is slid in the above-mentioned manner into the supporting profile with the end disk 24. The reason is that the turnbuckle, which is then axially anchored in the adapter piece 3, can also interact with the opening 26 as a stop and can hold the end disk 24 on the face of a supporting profile 1 without the requirement of special fastening operations. If the supporting profile 1, which in the embodiment shown in FIG. 9 is aligned horizontally, is anchored by means of the turnbuckle in the groove 2, the concave recess 25 of the end disk 24 constructed as a formed piece are pressed firmly against the face of the supporting profile 1 and secured. Naturally, it would also be conceivable here to provide end disks 24 with a square cross-section so that supporting profiles 1a, 1a' with a square cross-section can be connected in a perpendicular manner to supporting profiles 1, 1' having a round cross-section.

FIGS. 10 and 12 also outline another variant. A sleeve-shaped attachment 28, illustrated by a broken line, may be part of the end disk 24 and may secure the end disk 24 on the face of the assigned supporting profile in a manner known per se by means of screws laterally introduced as shown by the dash-dotted lines 29 in FIG. 10.

The construction according to the invention therefore opens up variation possibilities for combining supporting profiles which can be utilized particularly in constructions for fairs, exhibitions or stores for new structural variants.

The invention claimed is:

1. A supporting profile for erecting a structure, the supporting profile comprising:
   an elongated hollow body having first and second ends and a longitudinal groove on outside of the body;
   an adapter piece inserted into and secured to the first end of the elongated body, the adapter piece having a receiving chamber for receiving a turnbuckle; and
   a disk-shaped end piece disposed at the first end and connected to the adapter piece, wherein the disk-shaped end piece is mounted on a face of the hollow body and is fastened to the adapter piece by fasteners.

2. The supporting profile according to claim 1, wherein the end piece has a concave recess adapted to an external curvature of a round profile.

3. The supporting profile according to claim 2, wherein the end piece has an opening for the turnbuckle to pass through.

4. The supporting profile according to claim 1, wherein the end piece has a joint for connection to another profile.

5. The supporting profile according to claim 4, wherein the joint includes a first disk which extends perpendicular to the end piece and has a center bore, and a second disk having a center bore and being connected with the first disk by means of a bolt extending through the center bores and acting as an axis of rotation, the second disk having a fastening device for connection to another profile.

6. The supporting profile according to claim 5, wherein the second disk is connected to another end piece.

7. The supporting profile according to claim 5, wherein the second disk has a clamping part that is configured for insertion into a longitudinal grooves of another supporting profile.

8. The supporting profile according to claim 5 further comprising first and second hemispheres for covering two sides of each of the first and second disks.

9. The supporting profile according to claim 8, wherein each hemisphere has a threaded center bore and can be screwed onto a threaded end of the bolt.

\* \* \* \* \*